United States Patent
Pollock

(10) Patent No.: US 10,410,260 B1
(45) Date of Patent: Sep. 10, 2019

(54) AUCTIONING AND MANAGEMENT OF CLOUD-BASED SERVICES

(71) Applicant: West Corporation, Omaha, NE (US)

(72) Inventor: Bruce Pollock, Omaha, NE (US)

(73) Assignee: West Corporation, Omaha, NE (US)

( * ) Notice: Subject to any disclaimer, the term of this patent is extended or adjusted under 35 U.S.C. 154(b) by 1071 days.

(21) Appl. No.: 14/024,882

(22) Filed: Sep. 12, 2013

(51) Int. Cl.
*G06F 7/00* (2006.01)
*G06Q 30/02* (2012.01)

(52) U.S. Cl.
CPC .................. *G06Q 30/0283* (2013.01)

(58) Field of Classification Search
USPC ................................ 235/375, 376
See application file for complete search history.

(56) References Cited

U.S. PATENT DOCUMENTS

| | | | | |
|---|---|---|---|---|
| 8,621,058 B2* | 12/2013 | Eswaran | ............... | G06F 9/5072 709/223 |
| 2007/0180061 A1* | 8/2007 | Bantz | ............... | G06Q 10/00 709/219 |
| 2011/0313902 A1* | 12/2011 | Liu | ............... | G06Q 10/06 705/34 |
| 2012/0059917 A1* | 3/2012 | Dawson | ............... | G06F 21/105 709/223 |
| 2012/0072318 A1* | 3/2012 | Akiyama | ............... | G06Q 40/12 705/30 |
| 2012/0290348 A1* | 11/2012 | Hackett | ............... | G06Q 10/06 705/7.13 |
| 2013/0066940 A1* | 3/2013 | Shao | ............... | H04L 67/1025 709/201 |
| 2013/0080509 A1* | 3/2013 | Wang | ............... | H04L 12/66 709/203 |
| 2013/0291121 A1* | 10/2013 | Iovanov | ............... | G06F 9/541 726/28 |
| 2013/0304431 A1* | 11/2013 | Kannegala | ............... | G06Q 10/00 703/2 |
| 2014/0052506 A1* | 2/2014 | Lee | ............... | G06Q 30/02 705/14.1 |
| 2014/0115592 A1* | 4/2014 | Frean | ............... | G06F 9/5027 718/102 |
| 2014/0122374 A1* | 5/2014 | Hacigumus | ............... | G06Q 30/00 705/400 |
| 2014/0137214 A1* | 5/2014 | Mane | ............... | G06Q 30/04 726/4 |
| 2014/0279201 A1* | 9/2014 | Iyoob | ............... | G06Q 30/0631 705/26.7 |
| 2015/0304409 A1* | 10/2015 | Steuer | ............... | H04L 67/10 709/203 |
| 2015/0341230 A1* | 11/2015 | Dave | ............... | H04L 41/5058 705/7.29 |
| 2016/0019636 A1* | 1/2016 | Adapalli | ............... | G06Q 30/0641 705/26.62 |
| 2016/0226955 A1* | 8/2016 | Moorthi | ............... | G06Q 10/06 |

* cited by examiner

*Primary Examiner* — Tuyen K Vo

(57) ABSTRACT

A cloud access cost estimate application may receive a request message for access to at least one cloud application from a client computing device and identify one or more application cost variables corresponding to the cloud application identified. The application may then calculate a cost estimate to use the at least one cloud application, and transmit the cost estimate to the client computing device for approval prior to providing access to the at least one cloud application. A user interface may provide purchase options to demonstrate various options based on cost variables so a user device may identify the cost option best suited for the application usage.

20 Claims, 6 Drawing Sheets

AUCTIONING AND MANAGEMENT OF CLOUD-BASED SERVICES

TECHNICAL FIELD OF THE APPLICATION

This application relates to a method and apparatus of monitoring, adjusting and providing dynamic cloud service management, and more particularly, to offering clients access to different cloud options based on time, usage and other dynamic client usage variables.

BACKGROUND OF THE APPLICATION

Conventionally, cloud-based services are continuing to grow in popularity. The amount of usage of cloud services alone has grown significantly in the last 5 years. Initially, the enterprise users and even smaller organizations were using cloud servers to handle data storage and basic everyday client-server applications, such as email, data access, remote client access, etc. Since the popularity of cloud services continues to grow, so does the need for real-time cloud services, optimal bandwidth utilization, optimal processor utilization and other computing functions.

Just like any type of application, service or computer-based platform, the cloud outsourcing is beginning to experience large amounts of peek business hour usage 7 am-7 pm, 8 am-6 pm, 9 am-5 pm, etc., depending on what type of business is using cloud services. As a result, the demand for non-peak usage is becoming increasingly popular for users to secure, purchase, and ideally save money by shifting cloud requirements outside of the peak usage time frame.

SUMMARY OF THE APPLICATION

One example embodiment of the present application may provide a method that includes receiving a request message for access to at least one cloud application from a client computing device, identifying at least one application cost variable corresponding to the at least one cloud application and calculating a cost estimate to use the at least one cloud application. The method may also include transmitting the cost estimate to the client computing device for approval prior to providing access to the at least one cloud application.

An apparatus may include a receiver configured to receive a request message for access to at least one cloud application from a client computing device and a processor configured to identify at least one application cost variable corresponding to the at least one cloud application, calculate a cost estimate to use the at least one cloud application, The apparatus may also include a transmitter configured to transmit the cost estimate to the client computing device for approval prior to providing access to the at least one cloud application.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
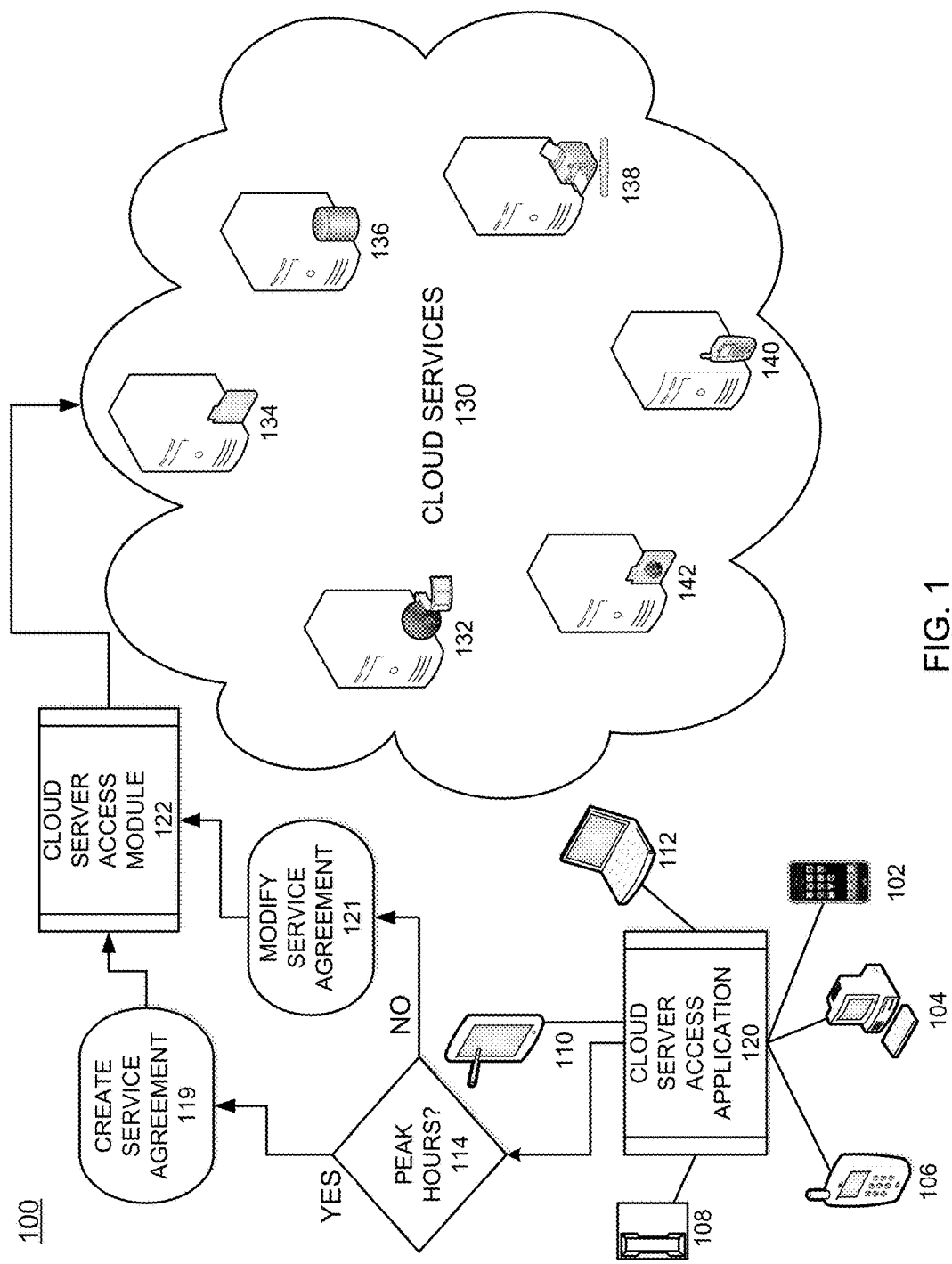
FIG. 1 illustrates an example cloud computer application access and configuration network according to example embodiments of the present application.

FIG. 1 illustrates an example cloud access and setup configuration network according to example embodiments. Referring to FIG. 1, the configuration 100 includes one or more end user or enterprise access device 102-110. Such devices may include a smartphone 102, a desktop computer 104, a mobile device 106, a telephone 108, a tablet computing device 110 and/or a laptop computer 112. In operation, one or more of those devices may be accessing, requesting and/or attempting to initiate a session with a particular application that is operated and/or managed by a remote cloud device, such as a server or other computer processing platform. The example servers 132-140 may include a content server 132, a file server 134, a database server 136, a printing server 138, a voice server 140 and/or an Internet server 142.

Any of the enterprise end users 102-110 may initiate a cloud service, application, etc., via a client plug-in that is installed on any of those devices to access a remote cloud server access application 120. The application may perform a preliminary determination as to whether the application on the cloud is being accessed during peak hours of usage 114. If not, then the service agreement previously used may be modified 121 to include the recent cloud application usage without changes to the standard billing, access and client expectations. However, in the event that the user is seeking a preferred service application during a peak usage time frame, or is attempting to access one of the premium cloud applications, then a new service agreement may need to be automatically created in order to reflect the corresponding changes to the billing, usage restrictions and other information necessary for the user to identify whether to confirm such a subscription service.

When the service agreement is setup, the user device may confirm the service and application desired and the cloud server access module 122 may provide an interface to route the device to a particular service/server in the cloud 130. Whichever server 132-142 that is required to satisfy the request may then be accessed and setup to communicate with the enterprise device(s) in order to provide application support for the subscribed customers. A service agreement 119 may be created on-the-fly when the application is accessed or a request for access is received from the access devices 102-112.

Figure 2:
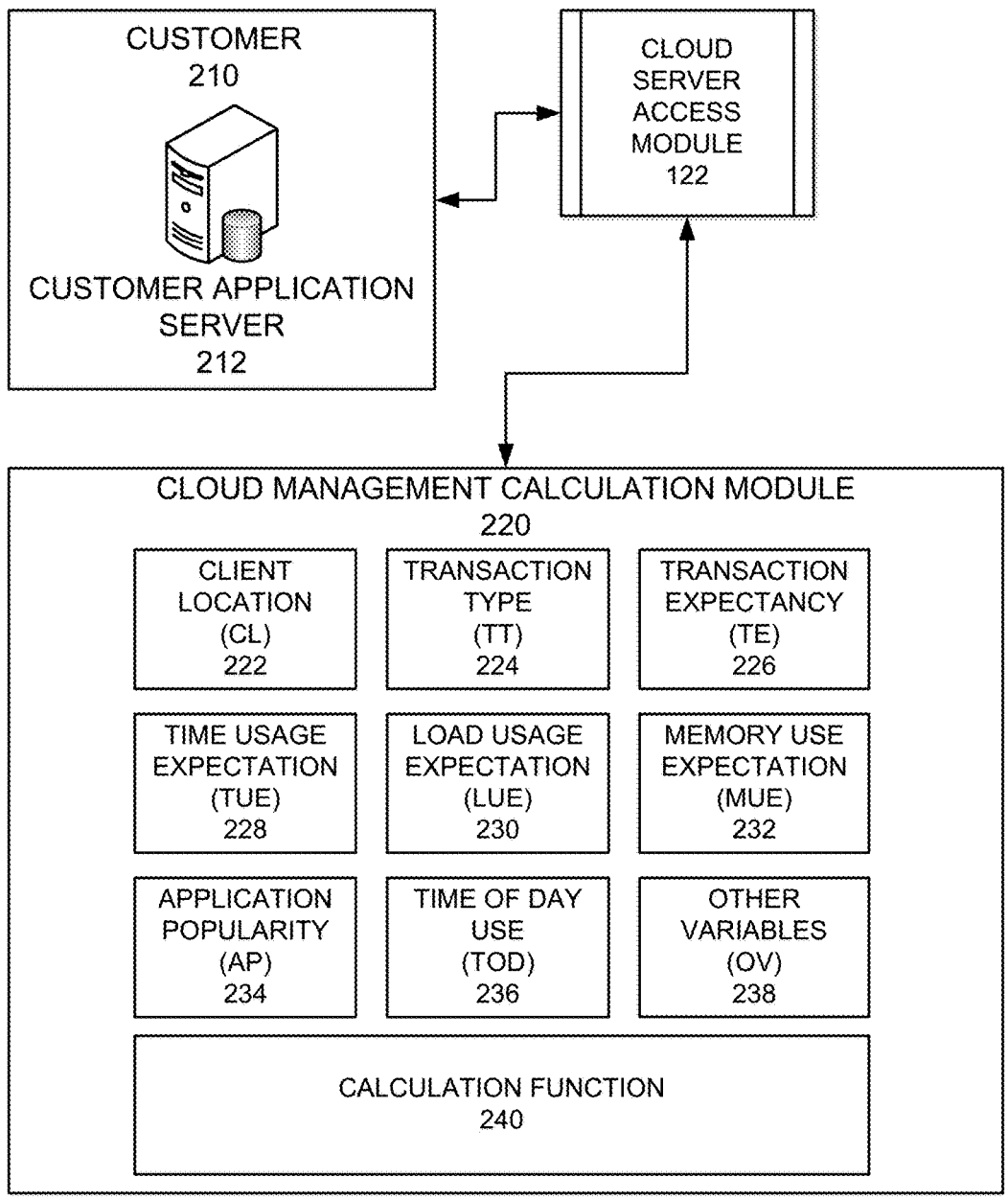
FIG. 2 illustrates an example logic diagram of cloud access and setup configuration according to example embodiments.

FIG. 2 illustrates an example logic diagram of cloud access and setup configuration according to example embodiments. Referring to FIG. 2, the logic configuration 200 includes a customer site 210 with a local application server 212 that communicates with the various enterprise computing devices. The server 212 may have a cloud server access module 122 that operates as software, hardware or a combination thereof to identify the cloud servers. The access module 122 may receive access requests from the customer site 210 and identify the cloud servers by IP address, name, and may provide secure credentials from the customer site 210. The access requests may be used as the basis to determine which users are authorized to access the cloud servers. Another cloud access module may include a cloud management calculation module 220 that is used as the basis to determine the client costs associated with the cloud usage depending on a number of variables 222-238.

In operation, a request to access an application or a service inquiry may be generated and transmitted from the customer site 210. The request may identify which servers, applications and other variables are needed to provide the customer with a proposal prior to accessing the servers and applications. For example, the customer may be desiring access to a particular application at a particular time of day. Requested variables, such as application type, time of day 236, client location 222 and duration 228 may be associated with the client request and may be identified in the request(s) message received. The other variables may be fixed or cloud specific variables, such as a transaction type 224, a transaction expectancy 226, cloud server load usage expectation 230, memory usage expectation 232, application popularity 234, and other variables 238. A calculation function 240 may be used to perform the calculation as a plurality of variables weighted the same or in some cases weighted differently for cost calculation purposes.

An example of a calculation function may provide a maximum possible 100% or highest possible value that is then reduced by one or more potential discounts. The total is summed and the result is a value that is generally less than the highest possible value. For example, the expression for determining a cost value (CV) may provide $(\Sigma=(CL+TT+TE+TUE+LUE+MUE+AP+TOD+OV))\times 100\%$. Each variable may be an increase or a reduction to the value 1 by an increment normalized to the number of total variables, for example, if the CL is at a far remote part of the country or the other side of the world the price may be incremented by a margin of 10 or 20% higher than normal to accommodate that value. However, the time zone of normal working hours for that client may be exactly opposite peak hours which would provide that a guaranteed discount is provided which offsets the client's remote location which will require an increase in the amount of bandwidth and routing capabilities. The calculation function may be based on one or more of the various variables illustrated in FIG. 2.

Figure 3:
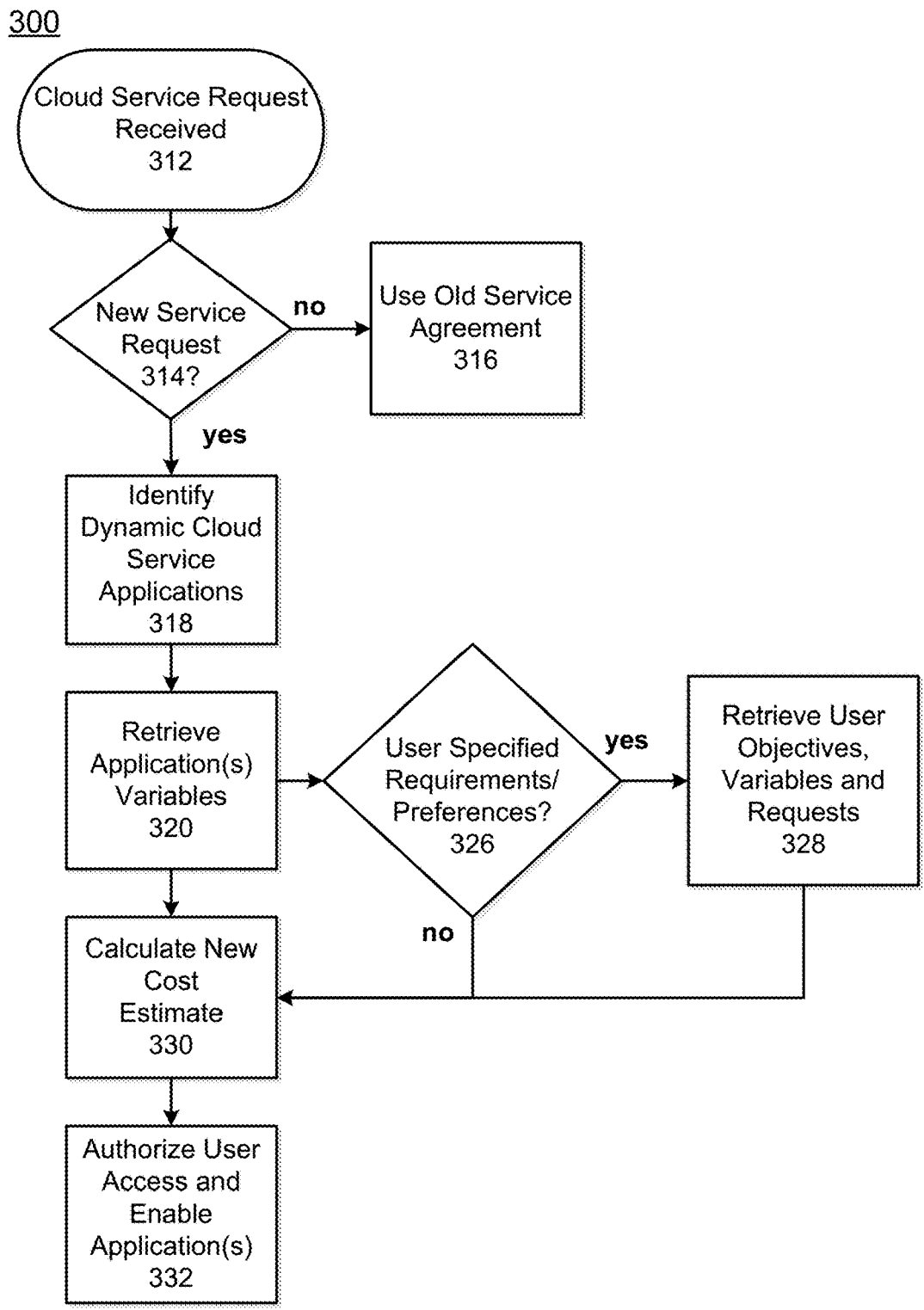
FIG. 3 illustrates an example flow diagram according to example embodiments of the present application.

FIG. 3 illustrates an example flow diagram according to example embodiments of the present application. Referring to FIG. 3, the example flow diagram 300 may provide an example where a user device or enterprise server transmits a cloud service request 312. The service request may be identified as requiring a new service 314 or may be classified as an old service request. If the service request is based on a previously used service application or server function of a cloud service then the old agreement 316 may be retrieved from a cloud application database associated with that particular client requesting a service. The request for a new agreement or new application function may require a new agreement or cost structure to be calculated prior to providing the user with the application requested. The new service agreement may be invoked based on one or more of a new application not previously used, a new time of day and/or a usage requirement not previously solicited.

In order to calculate a new or modified service agreement, certain dynamic cloud service applications may be identified 318 and used as the basis for the new calculations. The corresponding application variables 320 may be identified and used to provide a new cost estimate. Next, certain user specified requirements may be identified from the user request 326 and retrieved to provide additional information for calculating an accurate cost estimate prior to engaging the cloud services. For example, the user request may have a particular objective 328 "data storage", "voice" services and may have a particular requirement, such as real-time, high priority, encrypted, etc.

The information may be part of a request initiated from the user enterprise device. The cost estimate may then take the user requirements into consideration as additional variables or may not have any user specified requirements. As a result, the new cost estimate may be generated 330 and the user access may be authorized to enable applications 332. The cost estimate may be presented to the user for approval and may include different cost structures. For example, the costs may be provided at a peak time interval and may be offered in the alternative in an off-peak time frame to demonstrate the difference between the two options. Off-peak could be discounted by 10%, 20%, 30%, 40%, 50% or more if the user is willing to use the services outside a specified time frame to receive applicable discounts. For example, if a data backup operation is to be performed, then the network administrator may schedule and execute those types of jobs only during off-peak hours so the bandwidth and processor utilization in the cloud servers is performed outside of normal business hours and the corresponding price will be lowered accordingly for that cloud service.

Figure 4:
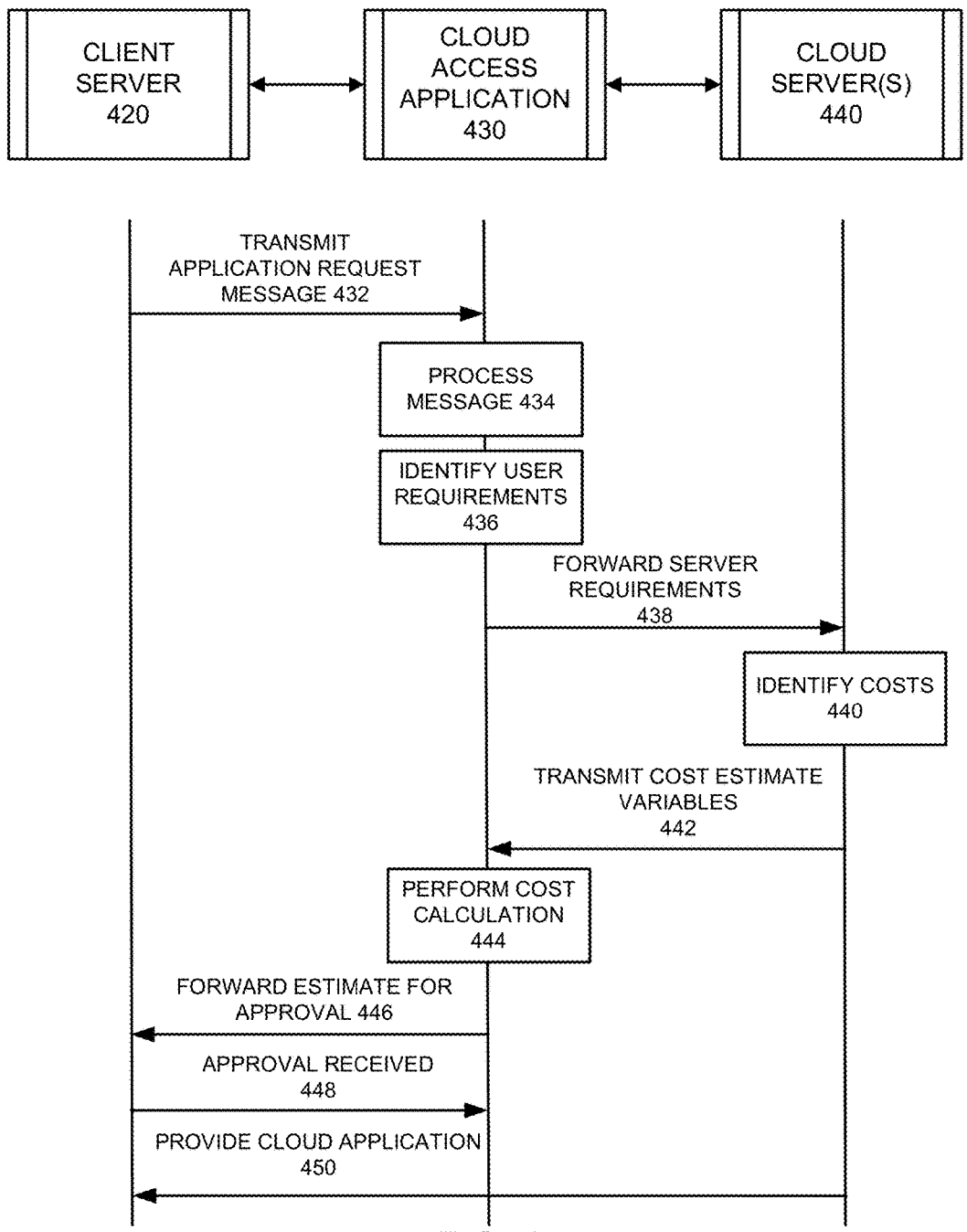
FIG. 4 illustrates an example system communication diagram according to example embodiments of the present application.

FIG. 4 illustrates an example system communication diagram according to example embodiments of the present application. Referring to FIG. 4, the communication signaling diagram illustrates the communications 400 between a client server 420 operating on the client enterprise network, a cloud access application 430 which may be installed and operated on the enterprise network or as a remote application on the cloud. The communication also includes a cloud server 440 that receives the service inquiries and information requests during the setup process of accessing cloud applications.

In operation, the client server 420 may transmit an application request message 432 to the cloud access application 430 for access to a particular cloud server, application, service etc. The request may be intercepted by the access application 430 and analyzed to generate a particular billing, access, and/or authorization contract or agreement that is used to track the application access conducted by the client server 420. The message may be received, processed 434 and the user's requirements may be extracted 436 to identify the type of service agreement needed for to satisfy the user's request. The server requirements may be forwarded to the cloud servers 438 for detailed information, such as those variables identified in FIG. 2 required to generate an accurate service report. The cloud servers 440 may identify the cost variables 440 and provide that information 442 back to the cloud access application 430 so the cost calculation 444 may be conducted. The estimate may be then calculated and transmitted to the client side 446 for approval. The client may approve the agreement or select the option that is most desirable and forward the approval 448 to the cloud access application. The client server 420 may then receive access to the cloud application 450.

According to one specific example of operation, an application estimate operation may provide identifying a company by name and profile. A user account record may be generated or retrieved from memory depending on whether the customer is an existing or a new customer. The transaction type may then be identified to locate the correct application software, hardware, cloud server, etc. For example, a voice service may be identified and then a number of expected transactions may be identified for a particular period of time (e.g., 30 days), such as for an entire billing cycle. The duration of the expected transactions may be identified, e.g, the average business call may be 35 seconds, 60 seconds, etc. The time frame for the majority of transactions may then be determined, such as 2 am to 6 am CT for a company located in a different time zone. The price one is willing to pay for the transaction is then identified as 0.01 cent per transaction with a flexible pricing model of 0.011 cent per transaction. Other options may include the option to cancel at any time or make changes at any time.

When the user device requests a particular application and corresponding agreement setup. The initial feedback received at the client device may include a user interface with certain selection options. The options may include selecting the application type/name, the usage requirements and other variables for options similar to those in FIG. 2. Once an initial setup is identified, additional options may be presented to drill down the access options and the final selection. The user may not be ready to accept the agreement until other price options are presented, such as alternative applications, alternative usage options, alternative time-of-day options, etc. Additional options may include transaction type, number of expected transactions, duration of expected transactions, time frame of transactions. The user may be presented with a sliding window or list of days, times, to scroll through and select with corresponding price adjustments.

Example embodiments provide a user account having a corresponding profile stored as a document in memory. The user profile could be accessed and referenced after a cloud access negotiation which permits the cloud server(s) to identify when to change a particular billing cycle, end an account usage schedule, add additional usage privileges, etc. Initially, the user may need to enroll in a particular program as a customer and update their profile information. A set of business rules/logic may be sued to determine how long the customer has access to a particular application, when they are going to be cut-off from using an application, when the account is replenished, the time of day the account is permitted to be active/inactive, etc. All this information may be accessible from the user's profile information. A user would also register a credit card or other payment source which is used as the basis to pay bills. The business rules/logic may also regulate if a user is using a service in accordance with a service level agreement (SLA) and/or paying their bills in a timely manner. If so, the service would continue and if not, a notification may be sent to the user prior to the cancellation time so they may have an opportunity to correct the account deficiency.

Figure 5:
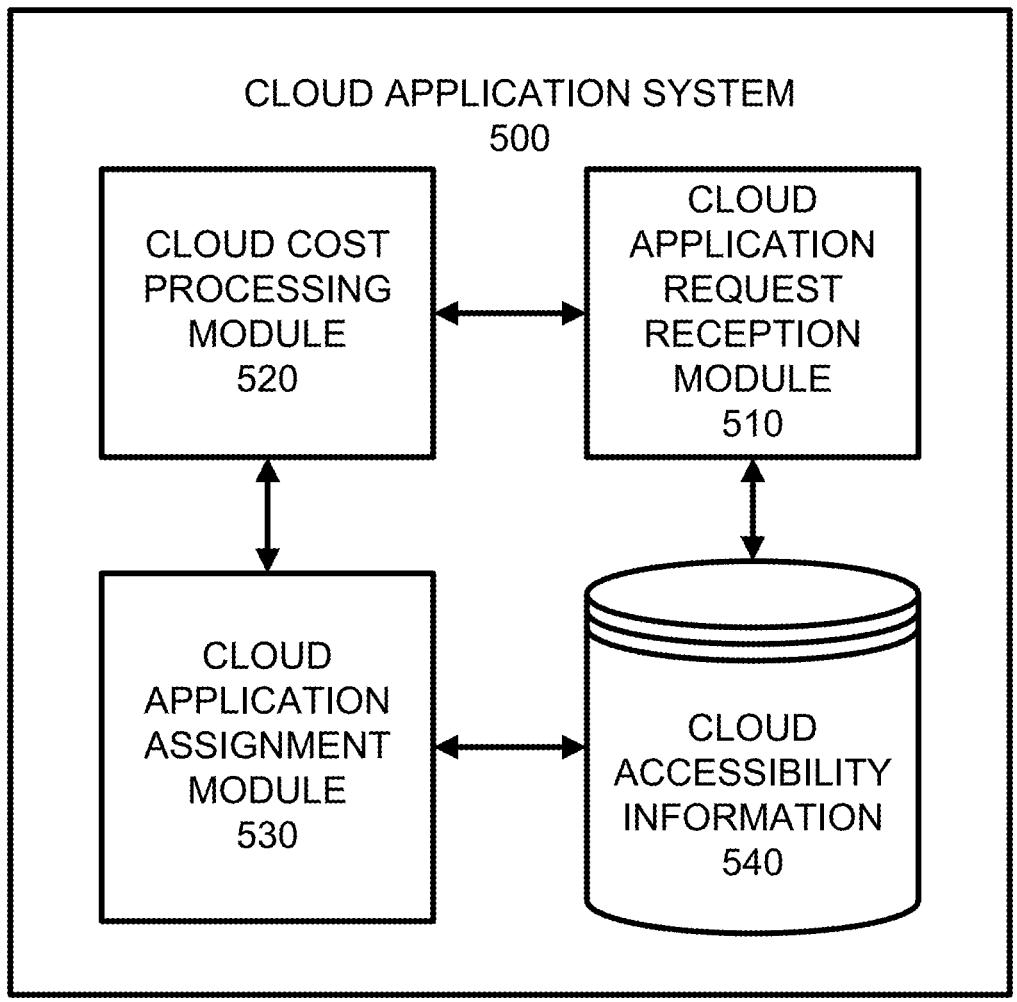
FIG. 5 illustrates an example cloud application access and configuration system according to the example embodiments.

FIG. 5 illustrates an example cloud application access and configuration system according to the example embodiments. Referring to FIG. 5, the system 500 includes a cloud application request reception module 510 that accesses a cloud accessibility information database 540 and a cloud cost processing module 520. The cloud application assignment module 530 may receive the processing of inputs and selections and finalize the selection options for usage purposes. According to one example method of operation conducted by the cloud application system 500. The cloud application request module 510 may receive a request message for access to at least one cloud application from a client device and identify at least one application cost variable corresponding to the at least one cloud application based on pre-stored information in the cloud accessibility information 540. Each application may have a corresponding cost per use, per day, per time of day and/or cost per application. The information may be used to generate a preliminary use agreement that can be modified prior to being selected by the user device.

The method may also provide calculating a cost estimate to use the at least one cloud application via the cloud cost processing module 520. The application may transmit the cost estimate to the client computing device for approval prior to providing access to the at least one cloud application. The client device may select other options and finalize the estimate prior to receiving access to the application. A user profile may be setup based on the transaction and accessed to keep records of the user account and any changes that may occur. Also, when the logged user accounts seek access to the cloud applications, their profile may be referenced prior to any additional access operations.

The one or more application cost variables are based on application specific information requested by the client and which may also be included in the request message. The application cost variable is based on expected use requirements of the cloud server that provides access to the application. The application cost variable(s) may be based on a time of day associated with the expected use of the application. Also, the cost estimate may include a number of other cost options each having a different cost estimate. The various cost options may be transmitted to the user device for access to the cloud application, the cost options are each based on a different combination of the application cost variables. The user device may provide at least one selection and a communication session may then be established to the at least one cloud server via the cloud assignment module 530. The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components of the other figures.

Figure 6:
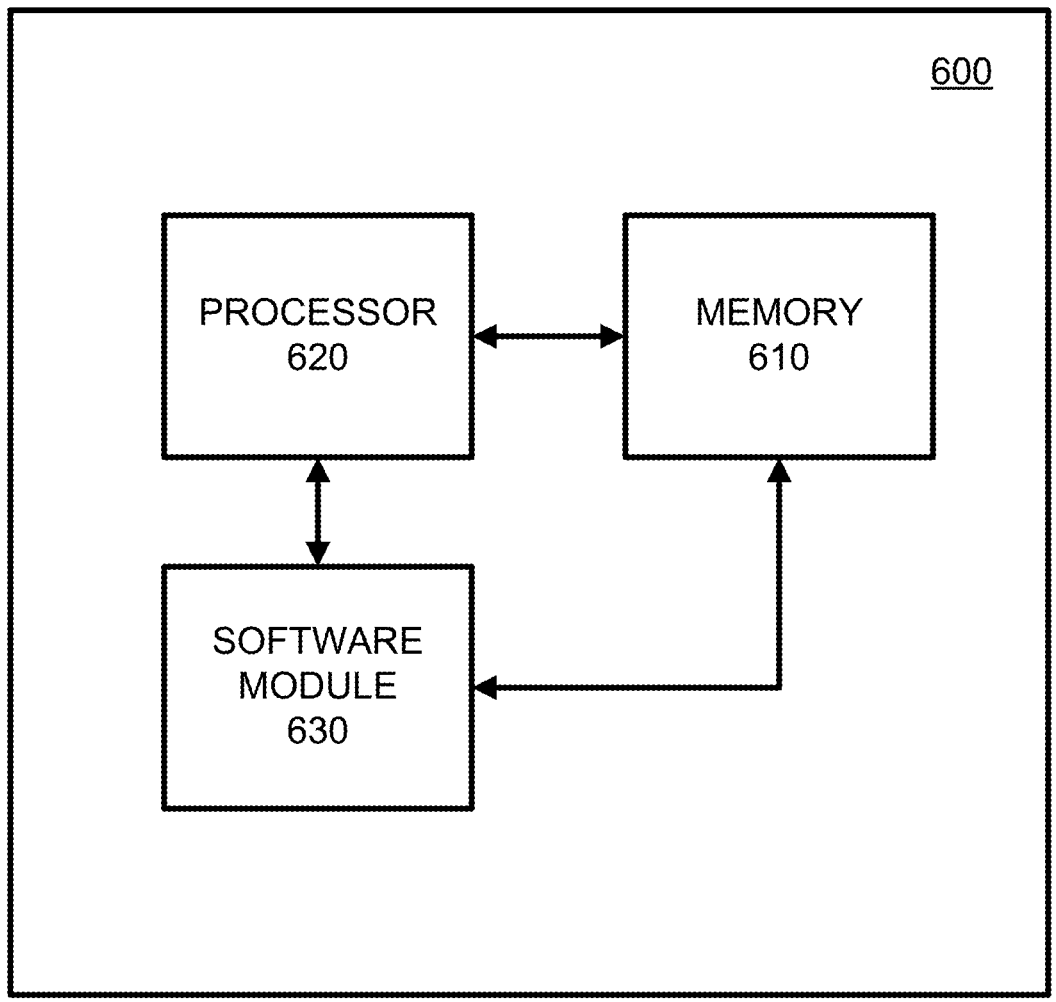
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 4 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
receiving a request message for access to at least one cloud application from a client computing device, the request message comprising an objective and a new time of day not previously requested;
identifying at least one application cost variable corresponding to the at least one cloud application;
calculating a cost estimate to use the at least one cloud application based on the at least one cloud application not being used previously by the client computing device and the new time of day for use;
transmitting the cost estimate to the client computing device for approval prior to providing access to the at least one cloud application;
accessing a server corresponding to the request message;
determining whether the at least one cloud application is being accessed during peak hours of usage;
in response to determining the at least one cloud application is not being accessed during peak hours of usage:
  modifying a current service level agreement to include recent cloud application usage and without changes to standard billing and access; and
in response to determining the at least one cloud application is being accessed during peak hours of usage:
  creating a new service agreement based on one or more of the at least one cloud application not being used previously by the client computing device, the new time of day for use, and a usage requirement not previously solicited.

2. The method of claim 1, wherein the at least one application cost variable is based on application specific information requested by the client and included in the request message.

3. The method of claim 1, wherein the at least one application cost variable is based on expected use requirements of the at least one cloud server that provides the at least one application.

4. The method of claim 1, wherein the at least one application cost variable is based on a time of day associated with the expected use of the application.

5. The method of claim 1, wherein the cost estimate comprises a plurality of cost options each having a different cost estimate.

6. The method of claim 1, further comprising:
transmitting a plurality of cost options to the client computing device for access to the at least one cloud application, wherein the plurality of cost options are each based on a different combination of the application cost variables.

7. The method of claim 1, further comprising:
receiving at least one selection corresponding to an approved cost estimate from the client computing device; and
establishing a communication session to at least one cloud server.

8. An apparatus comprising:
a receiver configured to receive a request message for access to at least one cloud application from a client computing device, the request message comprising an objective and a new time of day not previously requested;
a processor configured to
  identify at least one application cost variable corresponding to the at least one cloud application;
  calculate a cost estimate to use the at least one cloud application based on the at least one cloud application not being used previously by the client computing device and the new time of day for use,
  allow access between the client computing device and a server corresponding to the request message after the cost estimate is approved;
  determine whether the at least one cloud application is being accessed during peak hours of usage;
  in response to the processor determines the at least one cloud application is not being accessed during peak hours of usage:
    the processor modifies a current service level agreement to include recent cloud application usage and without changes to standard billing and access; and
  in response to the processor determines the at least one cloud application is being accessed during peak hours of usage:
    the processor creates a new service agreement based on one or more of the at least one cloud application not being used previously by the client computing device, the new time of day for use, and a usage requirement not previously solicited; and
a transmitter configured to transmit the cost estimate to the client computing device for approval prior to providing access to the at least one cloud application.

9. The apparatus of claim 8, wherein the at least one application cost variable is based on application specific information requested by the client and included in the request message.

10. The apparatus of claim 8, wherein the at least one application cost variable is based on expected use requirements of the at least one cloud server that provides the at least one application.

11. The apparatus of claim 8, wherein the at least one application cost variable is based on a time of day associated with the expected use of the application.

12. The apparatus of claim 8, wherein the cost estimate comprises a plurality of cost options each having a different cost estimate.

13. The apparatus of claim 8, wherein the transmitter is further configured to transmit a plurality of cost options to the user device for access to the at least one cloud application, wherein the plurality of cost options are each based on a different combination of the application cost variables.

14. The apparatus of claim 8, wherein the receiver is further configured to receive at least one selection corresponding to an approved cost estimate from the client computing device, and the processor is further configured to establish a communication session to at least one cloud server.

15. A non-transitory computer readable storage medium configured to store instructions that when executed cause a processor to perform:
receiving a request message for access to at least one cloud application from a client computing device, the request message comprising an objective and a new time of day not previously requested;
identifying at least one application cost variable corresponding to the at least one cloud application;
calculating a cost estimate to use the at least one cloud application based on the at least one cloud application not being used previously by the client computing device and the new time of day for use;

transmitting the cost estimate to the client computing device for approval prior to providing access to the at least one cloud application;

accessing a server corresponding to the request message;

determining whether the at least one cloud application is being accessed during peak hours of usage;

in response to determining the at least one cloud application is not being accessed during peak hours of usage:

modifying a current service level agreement to include recent cloud application usage and without changes to standard billing and access; and in response to determining the at least one cloud application is being accessed during peak hours of usage:

creating a new service agreement based on one or more of the at least one cloud application not being used previously by the client computing device, the new time of day for use, and a usage requirement not previously solicited.

16. The non-transitory computer readable storage medium of claim 15, wherein the at least one application cost variable is based on application specific information requested by the client and included in the request message.

17. The non-transitory computer readable storage medium of claim 15, wherein the at least one application cost variable is based on expected use requirements of the at least one cloud server that provides the at least one application.

18. The non-transitory computer readable storage medium of claim 15, wherein the at least one application cost variable is based on a time of day associated with the expected use of the application.

19. The non-transitory computer readable storage medium of claim 15, wherein the cost estimate comprises a plurality of cost options each having a different cost estimate.

20. The non-transitory computer readable storage medium of claim 15, wherein the processor is further configured to perform:

transmitting a plurality of cost options to the client computing device for access to the at least one cloud application, wherein the plurality of cost options are each based on a different combination of the application cost variables;

receiving at least one selection from the client computing device; and establishing a communication session to at least one cloud server.

\* \* \* \* \*